A. L. HARRELL.
LOCK NUT AND BOLT.
APPLICATION FILED DEC. 4, 1920.

1,413,024.

Patented Apr. 18, 1922.

Inventor
Annie L. Harrell
By Her Attorney
Fred C. Matheny

UNITED STATES PATENT OFFICE.

ANNIE L. HARRELL, OF SEATTLE, WASHINGTON.

LOCK NUT AND BOLT.

1,413,024.  Specification of Letters Patent.  Patented Apr. 18, 1922.

Application filed December 4, 1920. Serial No. 428,208.

*To all whom it may concern:*

Be it known that I, ANNIE L. HARRELL, a citizen of the United States, residing at Seattle, in the county of King and State of Washington, have invented certain new and useful Improvements in Lock Nuts and Bolts, of which the following is a specification.

My invention relates to improvements in lock nuts and bolts and the object of my improvement is to provide a nut and bolt construction of novel form in which the nut is firmly and securely locked on the bolt and will not tend to loosen regardless of the use in the nature of pounding, jarring and vibration to which it is subjected.

A further object is to provide a device of this nature that is strong and simple in construction and one wherein the nut portion may be quickly and easily removed from the bolt, when desired, without injuring either the threads of the bolt or the nut.

Another object is to provide a lock nut and bolt structure in which the threaded portions are shielded in such a way as to exclude moisture thus tending to prevent rusting of the threads.

A more specific object is to provide a bolt having a main right-hand thread and an auxiliary left-hand thread and to provide a three-piece lock nut arranged to screw onto the said right and left hand threads in such a manner that it may be firmly and securely locked at any point on the threads.

With the above and other objects in view the invention consists in the novel construction, adaptation and combination of parts of a lock nut and bolt as will be more clearly hereinafter described and claimed.

Figure 1:
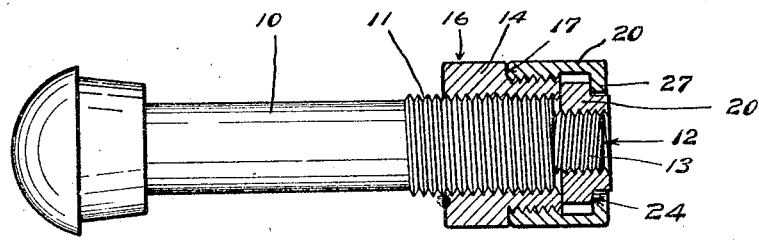
Figure 3:
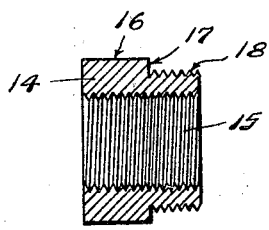
Figure 2:
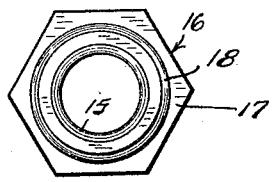
Figure 4:
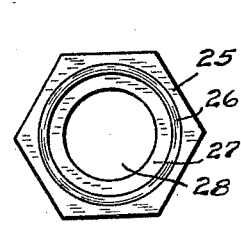
Figure 5:
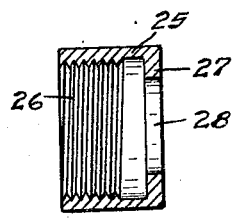
Figure 7:
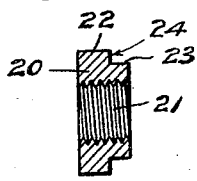
Figure 6:
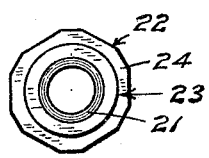
Figure 8:
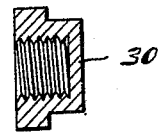

In the drawings, Figure 1 is a view in elevation of a bolt constructed in accordance with my invention, showing the same as it may appear when the lock nut is placed thereon, the lock nut being shown in cross section. Fig. 2 is a view in end elevation of another member; Fig. 3 is a view in longitudinal mid-section of the same; Fig. 4 is a view in end elevation of a cap member; Fig. 5 is a view in longitudinal mid-section of the same; Fig. 6 is a view in end elevation of a locking member; Fig. 7 is a view in cross section of the same, and Fig. 8 is a view in cross section of a slightly modified form of locking member.

Referring to the drawings, throughout which like reference numerals designate like parts, the numeral 10 designates a bolt having a right-hand thread 11 of the usual form at the end thereof and having a concentrically arranged integral stud 12 of less diameter than the main body of the bolt projecting outwardly from the end of the threaded portion, the stud 12 having a left-hand thread 13 cut thereon.

14 is a nut member having an internal thread 15 that is adapted to screw onto the external thread 11 of the main part of the bolt 10 and having an external polygonal portion 16 for the reception of a wrench. The forward or outer end of the nut member 14 is turned to a diameter that is smaller than the dimensions of the polygonal portion 16 thereby forming a shoulder 17 at the end of the polygonal portion, and such smaller forward end is provided with external threads 18 which may be either right or left hand as desired.

20 is locking member having an internal left-hand thread 21 that is adapted to fit the left-hand thread 13 of the stud 12 so that the locking member may be jammed tightly against the nut member 14 to securely lock the same.

The locking member 20 is formed with a larger external polygonal portion 22 and a smaller external cylindrical outer end portion 23 that forms a shoulder 24 at the point where it intersects the polygonal portion.

25 is a cap member having internal threads 26 that are adapted to interfit the threads 18 of the nut member 14 and having at its outer end an inwardly directed annular flange 27 that is arranged to engage with and press against the shoulder 24 and that forms a central opening 28 that fits over the cylindrical end portion 23 of the locking member.

If desired the locking member 20 may be formed with a closed outer end 30 as shown in Fig. 8 so that it will form a cap for the end of the stud 12 and by excluding moisture will prevent rusting of the threads 13 and 21.

The cap member 25 prevents the entrance of moisture between the abutting ends of the nut member 14 and locking member 20 thus further protecting the threads on both the bolt and the stud from rust. The exterior of the cap member 25 is polygonal and preferably corresponds to the shape of the polygonal portion of the nut member, see Figs. 2 and 4.

In operation the nut member 14 is first placed on the bolt, the locking member 20 is then screwed onto the stud 12 and preferably jammed tightly against the end of the nut and the cap member 25 is then screwed tightly onto the nut 14 so that the flange 27 is pressed firmly against the shoulder 24.

Any tendency of the nut to loosen will tend to tighten the locking member 20 and cap 25 on account of the opposite direction of the threads on the bolt 10 and on the stud 12.

It is not essential to the operation of the device that the nut 14 be jammed tightly against any object on the bolt, but if the said nut 14 is jammed tightly against an object through which the bolt passes and the locking member is jammed tightly against the nut the pressure against the nut 14 is obviously borne by both the threads on the bolt 10 and the threads on the stud 12.

If the lock member is not jammed tightly against the nut the two parts may nevertheless be locked securely against movement on the bolt by firmly tightening the cap 25.

From the foregoing description taken in connection with the accompanying drawings the form of construction and method of operation of my lock nut and bolt will be readily apparent, but, while I have described the principle of operation of the invention, together with the device which I now consider to be the best embodiment thereof, it will be understood that the lock nut and bolt shown are merely illustrative and that such changes in the form dimensions and arrangement of parts of the same may be resorted to as are within the scope of the claim.

What I claim is:—

A lock nut and bolt construction comprising a bolt, an integral stud of less diameter than said bolt on the end thereof, right and left hand threads on said bolt and said stud respectively, an internally threaded nut arranged to screw onto said bolt said nut having an externally threaded cylindrical outer end and a polygonal inner end of larger dimensions than said externally threaded outer end, an internally threaded locking member arranged to screw onto said stud said locking member having a polygonal inner end and a cylindrical outer end of smaller size than said polygonal inner end and forming an abrupt shoulder thereon, and an internally threaded cap arranged to fit over said locking member and screw onto said nut, said cap having a centrally disposed opening adapted to fit the cylindrical end of said locking member and having a flange arranged to abut against the shoulder on said locking member.

Signed at Seattle, Washington, this 22nd day of November, 1920.

ANNIE L. HARRELL.